F. K. SIMPSON.
SPEED TRANSMISSION MECHANISM.
APPLICATION FILED MAY 23, 1916.
1,226,392.
Patented May 15, 1917.
2 SHEETS—SHEET 1.
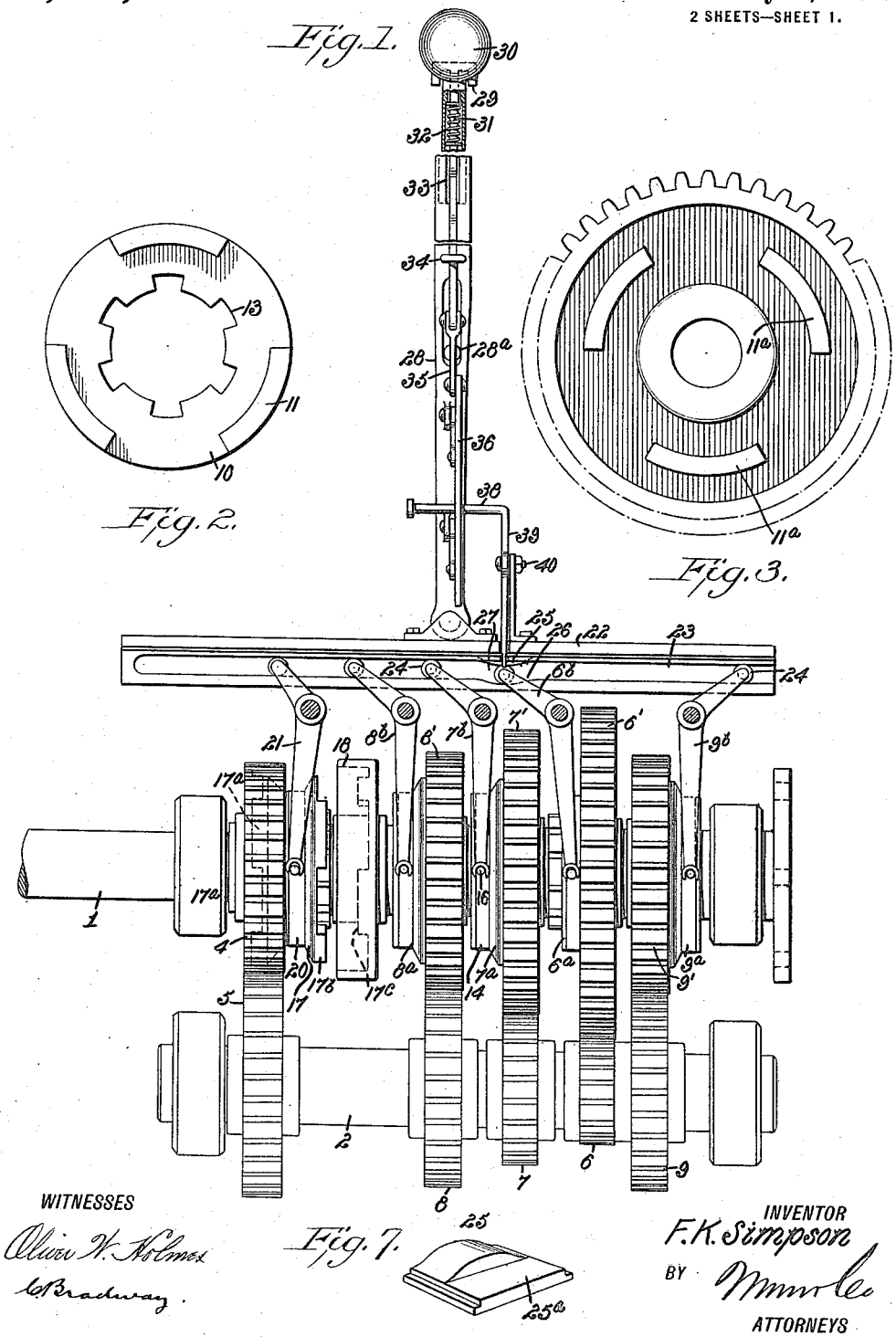
WITNESSES
INVENTOR
F. K. Simpson
BY
ATTORNEYS F. K. SIMPSON.
SPEED TRANSMISSION MECHANISM.
APPLICATION FILED MAY 23, 1916.
1,226,392.
Patented May 15, 1917.
2 SHEETS—SHEET 2.
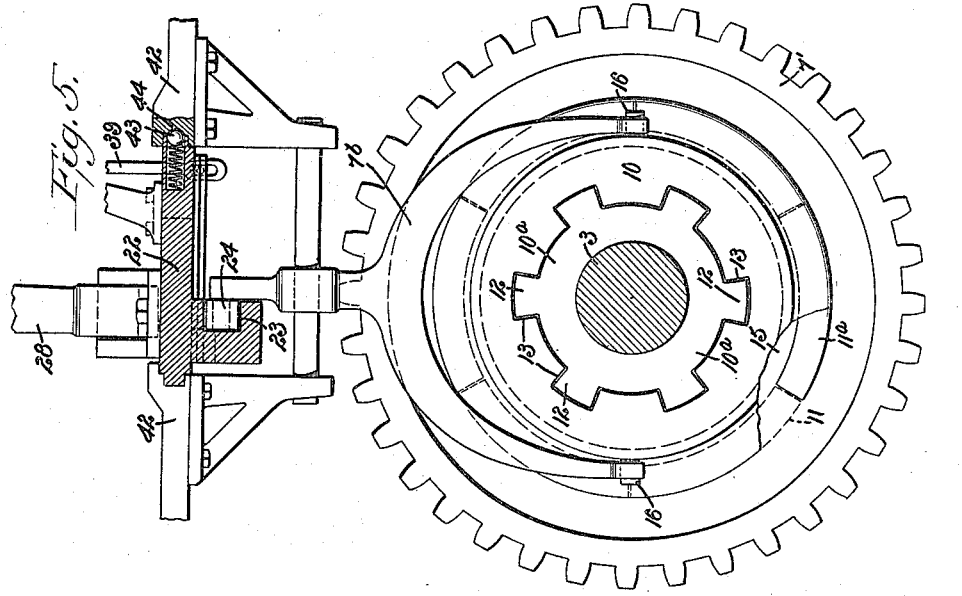
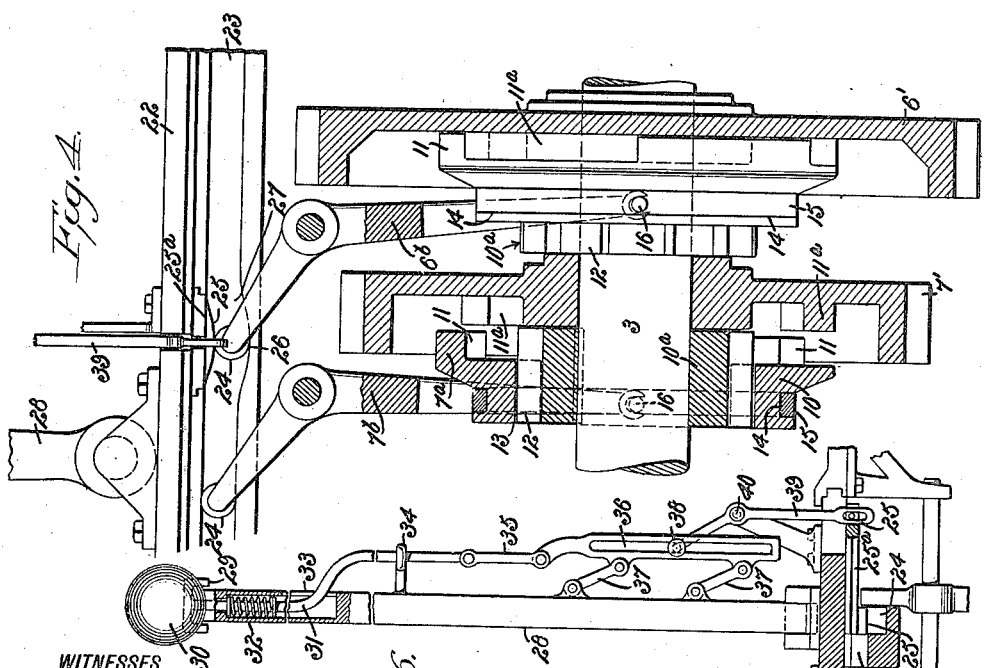
WITNESSES
INVENTOR
F. K. Simpson
BY
ATTORNEYS

UNITED STATES PATENT OFFICE.

FITZROY KRABIEL SIMPSON, OF KANSAS CITY, MISSOURI.

SPEED-TRANSMISSION MECHANISM.

1,226,392.

Specification of Letters Patent.

Patented May 15, 1917.

Application filed May 23, 1916. Serial No. 99,303.

*To all whom it may concern:*

Be it known that I, FITZROY K. SIMPSON, a citizen of the United States, and a resident of Kansas City, in the county of Jackson and State of Missouri, have invented a new and Improved Speed-Transmission Mechanism, of which the following is a full, clear, and exact description.

This invention relates to transmission devices especially adapted, although not necessarily limited, to automobiles, and it relates more particularly to that type of transmission mechanism having constantly meshing gears between the driving and countershaft and countershaft and driven shaft, with clutches for throwing in and out the gears, as desired, for producing the various speeds or changing the direction of rotation of the driven shaft.

The invention has for its general objects to improve and simplify the construction and operation of mechanisms of the character referred to so as to be reliable and efficient in use, and so designed as to insure a regular progression of speeds from zero to maximum and at the same time permit of a selection of speeds.

A more specific object of the invention is the provision of a novel actuating means for throwing in and out the various clutches to obtain the desired speed or vary the direction of rotation, and also for permitting the clutches to be so controlled as to facilitate the selection of the speeds, said actuating means including a one-way movable shift lever.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a side view of the mechanism;

Figs. 2 and 3 are companion elements of a clutch;

Fig. 4 is an enlarged sectional view of certain of the gears on the driven shaft and the clutches therefor;

Fig. 5 is a detail sectional view of the selective actuating means for the clutch levers;

Fig. 6 is a side view of the controller or actuator and associated parts; and

Fig. 7 is a perspective view of the adjustable cam for rocking the clutch levers.

Referring to the drawings, 1 designates the driving shaft, 2 the countershaft and 3 the driven shaft, the latter being arranged in axial alinement with the driving shaft and being capable of direct connection therewith. For all speeds except the direct drive speed the countershaft is rotated from the driving shaft by intermeshing gears 4 and 5 arranged respectively on the driving and countershafts. On the countershaft are gears 6, 7 and 8, increasing in diameter in the order named, and these intermesh with gears 6', 7' and 8' on the driven shaft, whereby three different speeds may be obtained. Also on the countershaft is a gear 9 which meshes with a pinion (not shown) that in turn meshes with a gear 9' on the driven shaft for producing reverse rotation of the latter. The various intermeshing sets of gears are constantly meshing so that there will be none of the objectionable features of throwing the gears into and out of mesh, as is common with the automobile gear sets now in common use. All the gears on the driven shaft are normally loose or free, and whenever power is to be transmitted through the gears from the driving to the driven shaft, the gear for the desired speed will be clutched to the driven shaft. For this purpose there are clutches 6ᵃ, 7ᵃ, 8ᵃ and 9ᵃ associated respectively with the gears 6', 7', 8' and 9'. Each clutch comprises a ring 10 slidable axially of the driven shaft 3, as shown in Fig. 4, and on this ring are suitably shaped teeth 11 which are engageable with companion teeth 11ᵃ on the adjacent gear. The ring 10 is keyed to the driven shaft so that the two will rotate together. For this purpose a collar 10ᵃ is fastened to the driven shaft, and the ring 10 surrounds it. The collar has teeth or ribs 12 which engage in recesses 13 in the ring 10. These ribs 12 are of such length in the direction of the axis that the ring 10 will be engaged with the collar in either extreme position of the ring. Each clutch element 10 has an annular groove 14 in which is disposed a ring 15 that is provided with oppositely disposed lugs 16 engaged by a forked shifting lever, the levers for the respective clutches being designated 6$^b$, 7$^b$, 8$^b$, 9$^b$. These levers are so related that when one clutch is closed all the other clutches will be open.

For obtaining a direct drive, the driving and driven shafts are adapted to be directly coupled together. For this purpose a double clutch element 17 is keyed to and slidably mounted on the driving shaft and it is provided with teeth 17$^a$ which are adapted to engage corresponding teeth on the gear 4, as shown by dotted lines in Fig. 1, and it is also provided with clutch teeth 17$^b$ adapted to engage with clutch teeth 17$^c$ of the disk or wheel 18 fastened to the inner end of the driven shaft. On the clutch element 17 is mounted a slip ring 20 engaged by a lever 21.

Normally the clutch element 17 is in the position shown in Fig. 1, whereby the gear 4 is clutched to the driving shaft 1, and this engagement is maintained at all times except when there is desired a direct transmission of power from the driving to the driven shaft. In this case the element 17 is moved to the right to disconnect the gear 4 from the driving shaft 1 and to connect the element 17$^c$ to the driving shaft. This means that all the gears will be idle when there is a direct drive, thus eliminating noise and wear.

The various levers above mentioned are so arranged that a single cam bar actuated by a single controlling lever can be employed to obtain a progressive variation of speed from low to high, and a reversal of rotation of the driven shaft. For this purpose a bar 22 movable rectilinearly is employed, the same having in one of its faces a longitudinal groove 23 in which are disposed rollers 24 on the various clutch levers. A cam 25 is disposed in the groove 23, and opposite the cam is a depression 26, so that the cam groove 23 will have a rounded offset at the point 27, and whenever this offset encounters a roller 24, the lever associated with such roller will be actuated. In Fig. 1 the low speed lever 6$^b$ is held by the cam bar in clutch-closed position, whereas the rest of the levers, except the lever 21 are in position to hold their associated clutches open, the lever 21 being held in a position to hold the gear 4 clutched to the driving shaft. When the cam bar is shifted slightly to the left, Fig. 1, all the gear levers will be in open clutch position. Starting from the position shown in Fig. 1 and moving the bar 22 to the left, the speed will successively increase from low to intermediate, to high and finally to direct drive speed, by the successive opening of the clutch 6$^a$, closing and opening of the clutch 7$^a$, closing and opening of the clutch 8$^a$ and shifting of the clutch 17 to interengagement with the member 18. By moving the cam bar to its full limit to the right the reverse lever 9$^b$ will be actuated to close the clutch 9$^a$, and thereby reverse the direct rotation of the driven shaft. Any number of sets of forward or reverse gears may be employed and operated by a single cam bar. The cam bar can be actuated by any suitable means, as for instance, a controlling lever 28 fulcrumed at 28$^a$ on a suitable support. In using the transmission mechanism in an automobile, the lever 28 will be so mounted that it will swing longitudinally of the car body, and preferably the rearward swing from neutral will be employed for increasing the speeds, and the forward swing will be used for the reverse drive.

For enabling a selection of speeds, the cam 25 is slidably mounted in the cam bar 22 so as to shift transversely thereto. As shown in Fig. 7, the cam 25 has a flat portion 25$^a$ which is capable of being thrown into the path of the rollers 24, whereby the cam bar can be shifted without actuating any of the levers, except the one which is desired to be actuated, and just before the cam reaches this particular lever it is restored to normal position. The cam actuating means is preferably carried on the controlling lever 28, and this actuating means embodies a push button 29 adjacent the knob or handle 30 of the controlling lever, and by pressing upwardly on the pushbutton the cam 25 is shifted. The pushbutton is fastened to the upper end of a rod 31 pressed by a spring 32. This rod 31 is guided in the upper end of the controlling lever and passes outwardly through a slot 33 therein and extends downwardly with its lower end movable in a guide 34 and connected by a link 35 with a slotted link 36. The slotted link is connected by parallel links 37 with the controlling lever, so that the link 36 will have a lateral and upward movement when the pushbutton 29 is pressed upwardly. In the slot of the link 36 engages a pin 38 on a lever 39 that is fulcrumed at 40 on the cam bar 22. The lower end of the lever 39 is connected with the body of the cam 25 to laterally shift the same. When the pushbutton is pressed upwardly the lower end of the lever 39 swings to the left and thereby throws the cam 25 into a recess 41 in the cam bar and out of the path of the rollers 24. When the pushbutton is released the spring 32 returns the parts to normal position. By this arrangement it is possible to shift immediately from high to low speed without throwing in the clutches 8$^a$ or 7$^a$. The cam bar is movable in suitable guides 42, Fig. 5, and to insure the shifting of the cam bar to its various operative positions a yielding clutch means, such as a spring-pressed ball 43, is mounted in the cam bar and is adapted to engage in depressions 44 in one of the guides 42, as shown in Fig. 5.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A transmission mechanism comprising a driving shaft, a driven shaft, a countershaft, sets of constantly meshing gears on the counter and driven shafts, clutches between one shaft and the gears thereon, a lever for each clutch, a single cam element engaging all the levers, whereby only one lever can be in clutch-closed position at a time, means for actuating the cam bar, said cam bar having a movable cam portion, and means for moving the cam portion into and out of operative position, whereby the levers can be operated selectively.

2. A transmission mechanism comprising a driving shaft, a driven shaft in alinement therewith, a countershaft, gearing means between the driving and countershaft, a clutch for connecting the gearing means and driving shaft or disconnecting the same while connecting the driving shaft with the driven shaft directly, a lever for the said clutch, meshing gears on the driven and countershafts, clutches for connecting the driven shaft with the gears thereon, levers for the said clutches, a cam bar having a groove in which all the levers engage, and means for actuating the cam bar for causing a progressive gradation of speed by the movement of the cam bar.

3. A transmission mechanism comprising a driving shaft, a driven shaft in alinement therewith, a countershaft, gearing means between the driving and countershaft, a clutch for connecting the gearing means and driving shaft or disconnecting the same while connecting the driving shaft with the driven shaft directly, a lever for the said clutch, meshing gears on the driven and countershafts, clutches for connecting the driven shaft with the gears thereon, levers for the said clutches, a cam bar having a groove in which all the levers engage, means for actuating the cam bar for causing a progressive gradation of speed by the movement of the cam bar, said cam bar having a movable cam portion, and means for throwing the cam portion into or out of position for actuating the levers, whereby the gears can be operated selectively.

4. A transmission mechanism comprising a driving shaft, a driven shaft, a countershaft, a clutch means normally connecting the driving and countershafts and adjustable for disconnecting them and connecting the driving and driven shafts, intermeshing gears on the counter and driven shafts, clutches for connecting the driven shaft with the gears thereon, and a single lever control mechanism for actuating the clutches to produce a successive gradation of speed through a certain range of the movement of the control mechanism and a direct connection of the driving and driven shafts through the operation of the first-mentioned clutch by further movement of the said control mechanism, a reverse gear connection between the driving and countershafts, a clutch for the said connection, and means for operating the clutch by the movement of the said control mechanism in a direction from neutral position opposite from that by which the speed is increased.

FITZROY KRABIEL SIMPSON.

Copies of this patent may be obtained for five cents each, by addressing the "Commissioner of Patents, Washington, D. C."